United States Patent [19]
Gilblom

[11] Patent Number: 5,959,605
[45] Date of Patent: Sep. 28, 1999

[54] VIDEO MAGNIFIER

[75] Inventor: David L. Gilblom, Los Altos, Calif.

[73] Assignee: Picker International, Inc.

[21] Appl. No.: 08/661,370

[22] Filed: Nov. 22, 1995

[51] Int. Cl.⁶ .................................................. G09G 5/26
[52] U.S. Cl. ........................ 345/130; 345/507; 345/127; 345/131; 382/298
[58] Field of Search .................... 345/127, 131, 345/130, 507; 382/298

[56] References Cited

U.S. PATENT DOCUMENTS

| 4,366,475 | 12/1982 | Kishi et al. ............................. 340/731 |
| 4,532,605 | 7/1985 | Waller ..................................... 364/900 |
| 4,800,379 | 1/1989 | Yeomans . | |
| 4,991,935 | 2/1991 | Sakurai . | |
| 5,315,377 | 5/1994 | Isono et al. ............................... 348/51 |
| 5,874,965 | 2/1999 | Takai et al. .............................. 345/357 |

*Primary Examiner*—Richard A. Hjerpe
*Assistant Examiner*—Vanel Frenel
*Attorney, Agent, or Firm*—Timothy B. Gurin; John J. Fry

[57] ABSTRACT

A method and device for selectively displaying a magnified image which permits an operator to appreciate the magnified image in its original context. The device includes a main monitor, a magnifier monitor, associated memories, and a controller. The magnifier monitor is movably mounted with respect to the main monitor. The position of the magnifier monitor in two dimensions represents the approximate center of a region on the main monitor to be magnified. The magnifier monitor is movable in a third dimension, and the position of the magnifier in the third dimension is used to determine the degree of magnification desired.

18 Claims, 6 Drawing Sheets

VIDEO MAGNIFIER

FIELD OF THE INVENTION

The invention relates to a method and device for selectively displaying a magnified image.

DESCRIPTION OF THE RELATED ART

With the advent of low cost digital computers, the use of computers and associated monitors in imaging applications has increased. Compared to previous technologies such as photographic film, the use of computers and digital techniques allows relatively simple manipulation, storage, and display of images.

One particularly important aspect of these new technologies is the ease in which a desired image can be viewed. Often, an operator will desire to view a detailed representation of an area of particular interest in a larger image while at the same time viewing the area of interest in the context of the surrounding image. A related issue is the need to choose an appropriate magnification for the image. Too great a magnification will show small detail at the expense of displaying a larger context and making it difficult of locate other regions of interest. Low magnifications may show the entire image but may make it difficult to view small detail and may also mask subtle shading in small areas.

One solution involves the use of the use of an optical magnifying lens to magnify all or part of an image displayed on a monitor. This solution often does not provide increased detail, however, because the detail is not sent to the monitor due to the number of pixels available on the monitor or because of the size and geometry of the pixels on monitor itself. The use of an optical lens further introduces geometric distortion and chromatic aberrations generally associated with such lenses.

Another solution is a scheme whereby an operator selects a portion of the displayed image for increased magnification. The magnified image is then displayed on the monitor at a location away from original context (such as in a corner of the display). A related technique is to display the magnified image at its original location on the monitor. In either case, the surrounding context is lost.

In addition, because the brightness and contrast of a monitor is ideally set to permit viewing of the entire image, the settings for an area of particular interest may not be optimal. In some cases, it is not possible to find a setting for the entire display which performs acceptably for the area of interest. This is especially true where there is stray light and the relative brightness of the area of interest is low.

Thus, the need for a device which permits the operator to selectively magnify a portion of a displayed image, while permitting the operator to appreciate the magnified image within its original context, is evident.

SUMMARY OF THE INVENTION

The present invention is directed to a device and method which facilitates the magnification of a selected portion of a displayed image, while permitting the magnified image to be viewed within the context of the original image. The invention includes a magnifier monitor movably mounted with respect to at least one main monitor, means for determining the position of the magnifier monitor, and means for causing, based on the position of the magnifier monitor, the magnifier monitor to display a magnified portion of the image displayed on at least one of the main monitors.

According to another aspect of the invention, the invention includes an image memory which contains digital data describing at least a first image. The invention also includes at least one main monitor, each main monitor displaying a corresponding main image, as well as a main monitor memory associated with each main monitor, which memory contains digital data representing the image to be displayed on the corresponding main monitor. Further, the invention includes a magnifier monitor which is movably mounted with respect to each of the main monitors, as well as a magnifier memory which contains digital data representing the image to be displayed on the magnifier monitor. A means for determining the position of the magnifier monitor is also included. In addition, the invention includes a controller which is connected to the image memory, the magnifier memory, and the means for determining the position of the magnifier monitor. Based on the output of the position determining means, the controller provides the magnifier memory with digital data representing a magnified portion of the image displayed on at least one of the main monitors. Such data is obtained from the image memory.

Another aspect of the present invention is that the magnifier monitor is movable in two dimensions. The position of the magnifier monitor in these two dimensions represents the approximate center of a region on at least one of the main monitors to be magnified. Additionally, the magnifier monitor can be movable in a third dimension, where the position of the magnifier monitor within the third dimension represents the desired magnification of the image displayed on the magnifier monitor. Alternatively, the magnification may be adjusted using a separate magnification control.

According to other aspects of the invention, the magnifier monitor is movably mounted on a mounting arm. The position determining means can be one or more encoders, potentiometers, ultrasonic locators, or similar devices.

According to another aspect of the invention, the magnifier monitor is free-floating. In this embodiment, the position determining means is an ultrasonic locator.

Another aspect of the invention is that the device contains a brightness and a contrast control which are used to adjust the brightness and contrast of the image displayed on the magnifier monitor independent from each of the main monitors.

In yet another aspect of the invention, a magnifier controller is connected to each of the main monitor memories, the magnifier memory, and the position determining means. Based on the position of the magnifier monitor, the magnifier controller provides the magnifier memory with digital data representing a magnified portion of the image displayed on at least one of the main monitors. Such data is obtained from the corresponding main monitor memory or memories.

DRAWINGS

These and other features, aspects and advantages of the present invention will become better understood with regard to the following description, appended claims, and accompanying drawings, where:

DESCRIPTION

Figure 1:
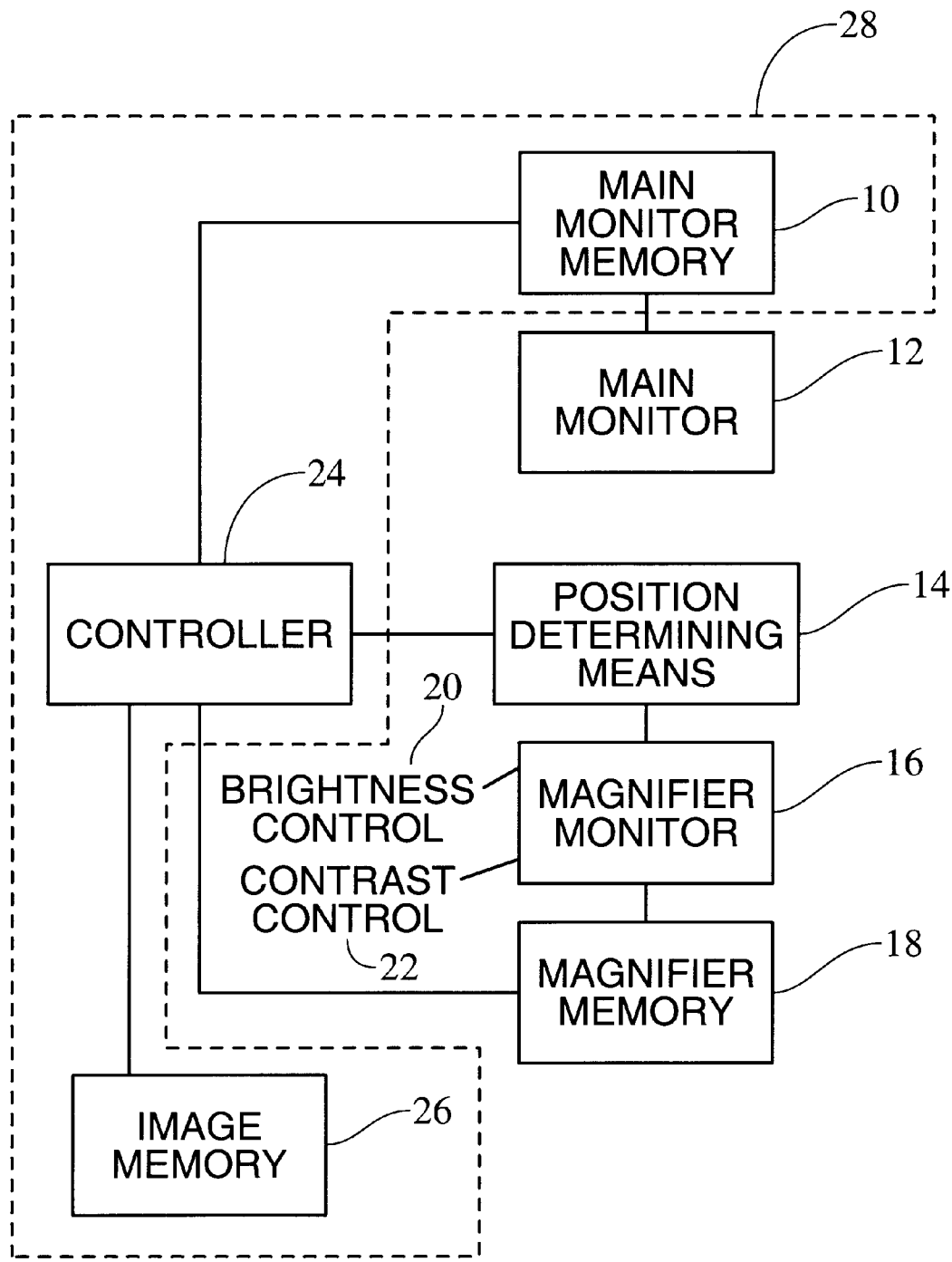
FIG. 1 shows an embodiment of the invention where the magnifier monitor data is obtained from the image memory.

As shown in FIG. 1, the video magnifier comprises a main monitor memory 10, a main monitor means 12, a position determining means 14, a magnifier monitor 16, a magnifier memory 18, a brightness control 20, a contrast control 22, a controller 24, and an image memory 26. The controller 24, main monitor memory 10, and image memory 26 are contained in an imaging computer 28.

The main monitor memory 10 is a conventional digital memory having sufficient capacity to contain a digital representation of an image to be displayed on the main monitor 12. The main monitor means 12 is a conventional computer monitor, flat panel display, LCD display or other display device which displays the image data contained in the main monitor memory 10. The main monitor 12 can be monochrome or color, depending on the requirements of the application, and is mounted in a substantially fixed position, such as against a wall. The image displayed on main monitor 12 may consist of multiple sub-images, for example where a plurality of different views such as those used in medical imaging applications are simultaneously displayed at different positions on the main monitor.

The magnifier monitor means 16 is a conventional computer monitor, LCD display or other display means, preferably of the back lighted flat panel type. The magnifier monitor 16 can also be monochrome or color. Depending on the requirements of the application, one of the main monitor 12 and the magnifier monitor 16 can be monochrome and the other color, or both can be of the type monochrome or color. The magnifier monitor 16 displays the image data contained in magnifier memory 18. Magnifier memory 18 is a conventional digital memory having sufficient capacity to contain a digital representation of the image to be displayed on the magnifier monitor 16.

Figure 3:
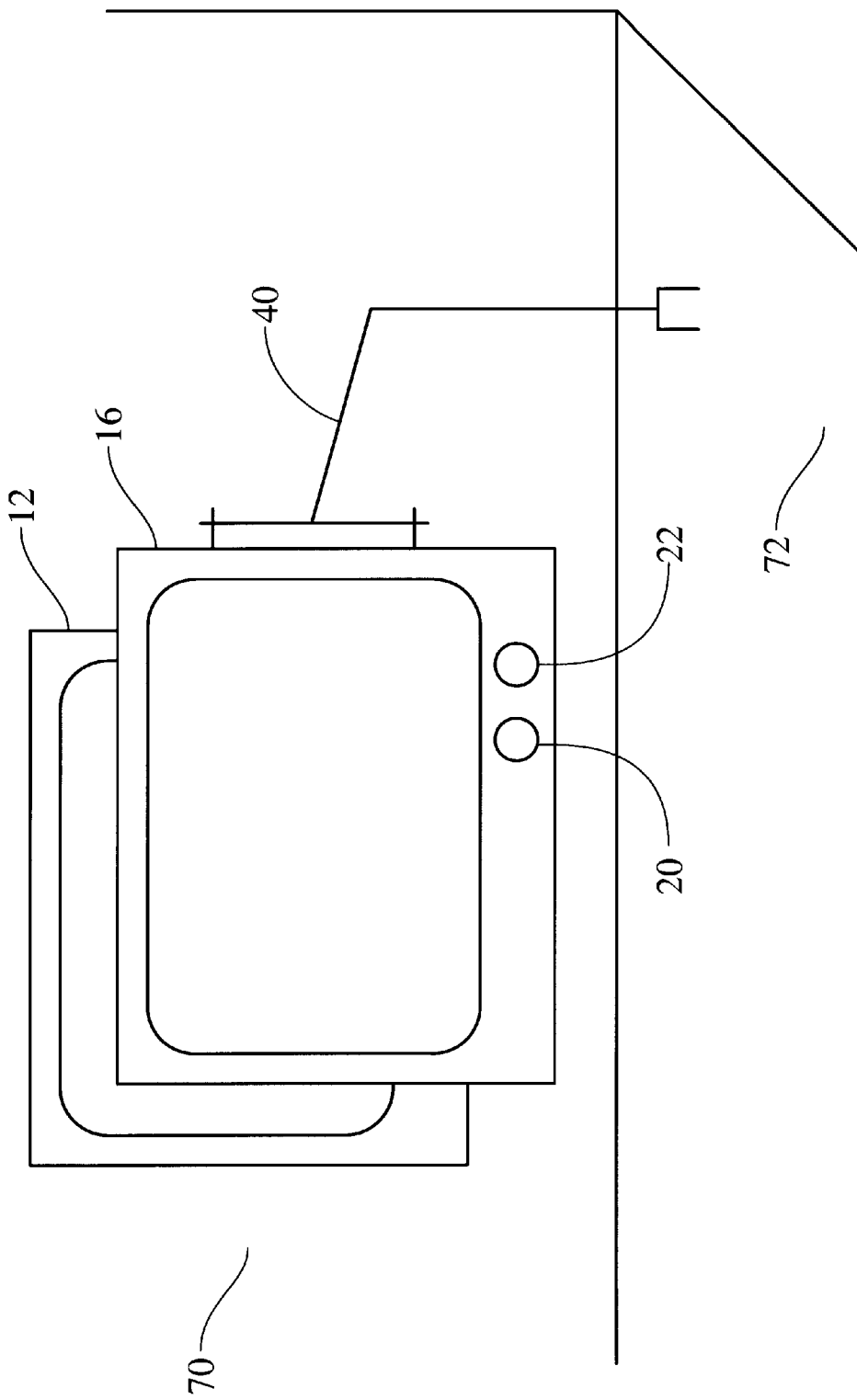
FIG. 3 shows the magnifier monitor mounted on an articulated mounting arm.

The magnifier monitor 16 is movably mounted with respect to the main monitor, preferably by way of movable mounting means such as an articulated arm shown schematically in FIG. 3. In one embodiment of the invention, the magnifier monitor 16 is movable in two dimensions. The position of the magnifier monitor 16 in these two dimensions is used to define the approximate central point of a region of the image displayed on the main monitor 12. This point defines the approximate central point of the region to be magnified. The magnifier monitor 16 is preferably movable in a third dimension. The position of the magnifier monitor 16 in this third dimension is used to define the desired degree of magnification of the image displayed on the magnifier monitor 16. The mounting arm is fastened to a stable mounting surface such as a floor or preferably a ceiling.

The movable mounting means for the magnifier monitor 16 is preferably configured so that the magnifier monitor 16 remains substantially motionless when physically undisturbed but is movable with relatively little effort on the part of the operator. The joints of articulated mounting arm 40 are fitted with position determining means 14 such as position encoders or potentiometers, the outputs of which are used by the controller 24 to calculate the position of the magnifier monitor 16. Where the magnifier monitor 16 is movable in two dimensions, two position determining means 14 are required. Where the magnifier monitor 16 is movable in three dimensions, a third position sensing means 14 is required. One or more pantographs may also be used, the first to prevent the magnifier monitor 16 from rotating with respect to the main monitor 12, the second to maintain the magnifier monitor 16 substantially coplanar with the main monitor 12. Power, data, position, and control information for the magnifier monitor is provided through cabling routed along the mounting arm 40. The relative size of the magnifier monitor 12 and the main monitor 12 shown in FIG. 3 is for the convenience of the draftsman.

Figure 4:
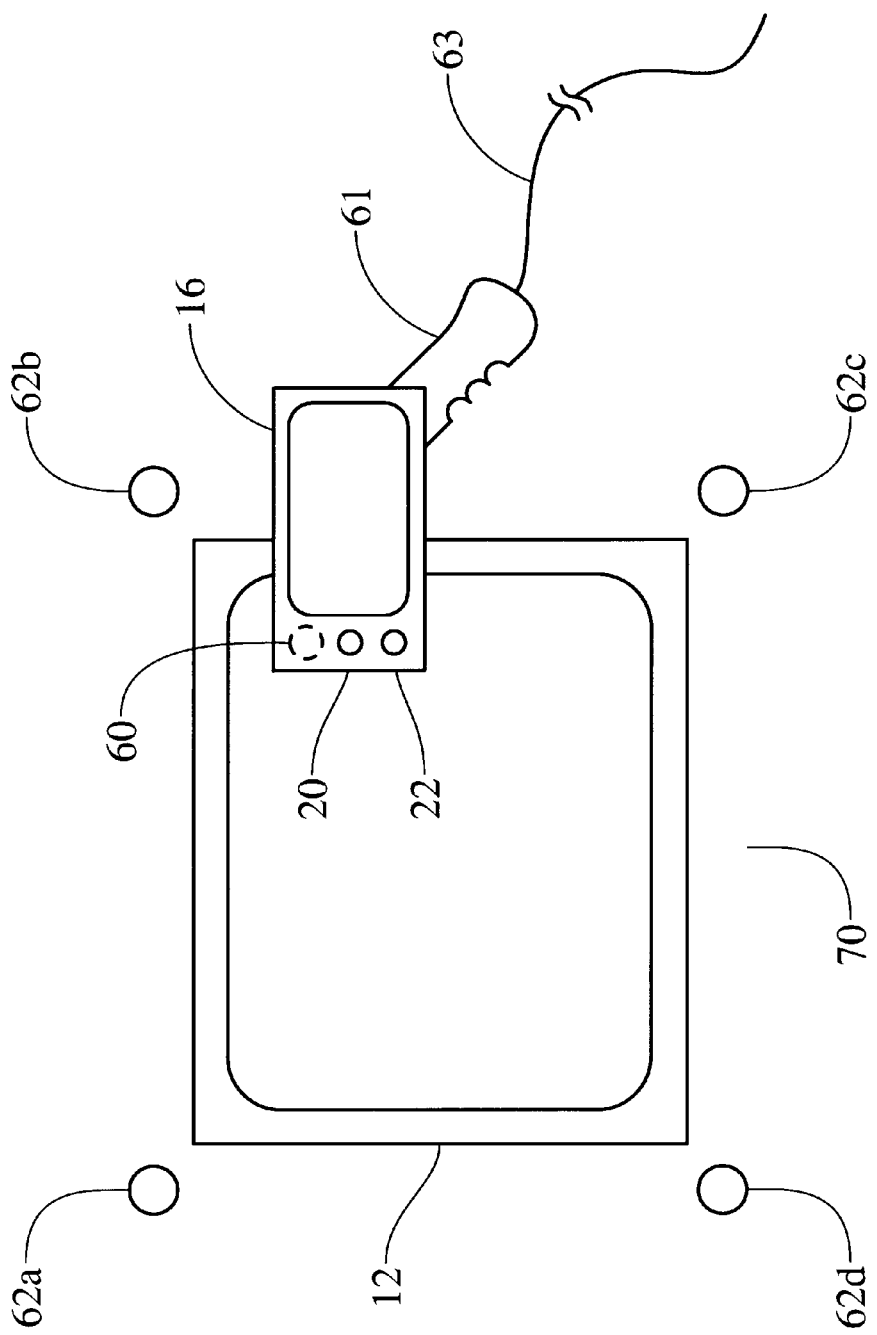
FIG. 4 shows a free floating magnifier monitor using an ultrasonic locator.

In an alternative embodiment, the magnifier monitor 16 is free floating as shown in FIG. 4. The relative size of the magnifier monitor 16 and the main monitor 12 is shown in FIG. 4 for the convenience of the draftsman. According to this embodiment of the invention, the position of the magnifier monitor 16 is determined using an ultrasonic locator. The magnifier monitor 16 is fitted with a conventional ultrasonic transmitter 60. Ultrasonic receivers 62a–d are mounted near each corner of the main monitor 12 in a plane substantially parallel to that of the main monitor 12 and at a distance relatively close to the main monitor 12. Where it is desirable to determine the position of the magnifier monitor 16 in three dimensions, a fifth ultrasonic receiver is mounted generally within the area bounded by the four receivers 62a–d and at a distance from the main monitor 12 at least as large as the magnifier monitor 16 will be moved from the main monitor 12. Power, data, position, and control information for magnifier monitor 16 is provided through conventional cabling 63. The outputs of the ultrasonic receivers 62a–d are used to determine the position of the magnifier monitor 16 using conventional techniques. The operator prevents the magnifier monitor 16 from rotating or losing parallelism with respect to the main monitor 12. Magnifier monitor 16 is fitted with a gripping means such as a handle 61 to ease manipulation and movement of the magnifier monitor 16 by the operator. An ultrasonic locator could also be used with the magnifier monitor 16 mounted on a mounting arm as described above.

With reference to FIG. 1, the controller 24 is a conventional microprocessor based controller. The controller 24 accepts the output of the position determining means 14 and calculates the position of the magnifier monitor 16. Preferably, the magnifier monitor 16 is movable in three dimensions, and the position of the magnifier monitor 16 in the third dimension is used by the controller 24 to calculate a desired magnification so that moving the magnifier monitor 16 away from the main monitor 12 increases the magnification of the image displayed on the magnifier monitor. Where the magnifier monitor 16 is movable in only two dimensions, the desired magnification is calculated by the controller 24 based on an operator input. The operator input is provided by an input device such as a potentiometer or switch operatively connected to the controller 24 and physically mounted in a convenient location, preferably on the magnifier monitor 16. Image memory 26 is a conventional digital memory having capacity sufficient to contain a digital representation of at least one image. The image memory 26 generally contains data representing an image in greater detail than is displayed on the main monitor 12 due to the above-noted limitations in the main monitor 12. In addition, the image memory 26 may contain an image larger than that displayed on the main monitor 12 in the sense that the only a portion of the image contained in the image memory 26 may be displayed on the main monitor 12. In the preferred embodiment, the main monitor memory 10, controller 24, and image memory 26 are contained in an imaging computer 28.

Based on the predetermined functionality of the imaging device or on parameters provided by the operator, the controller 24 selects from within the image memory 26 digital data representing the image to displayed on the main monitor 12. The controller 24 takes this data, formats it to satisfy the requirements of the main monitor 12, and stores the reformatted data in the main monitor memory 10 for display on the main monitor 12.

Based on the calculated position of the magnifier monitor 16 as well as the desired degree of magnification, the controller 24 selects from within the image memory 26 digital data representing the image to be displayed on the magnifier monitor 16. The controller 24 takes this data, formats it to satisfy the requirements of the magnifier monitor 16, and stores the reformatted data in the magnifier memory 18. In this way, a magnified image is selectively displayed on the magnifier monitor 16.

By way of example, it will be appreciated that sixteen original image data sets of 2048×2048 each contained in image memory 26 may each be displayed concurrently as 512×512 images on a single 2048×2048 main monitor 12. By permitting the controller 24 to obtain data directly from the image memory 26, each of the original images may then be displayed on magnifier monitor 16 with a full range of magnification available (up to 16× in the example given) for each image.

In addition, the magnifier monitor 16 contains conventional brightness 20 and contrast 22 controls, which allow the brightness and contrast of the magnifier monitor 16 to be adjusted independent from the brightness and contrast of the main monitor 12. Adjusting the brightness or contrast of the image displayed on the magnifier monitor 16 does not affect the brightness or contrast of the image displayed on the main monitor 12.

Figure 2:
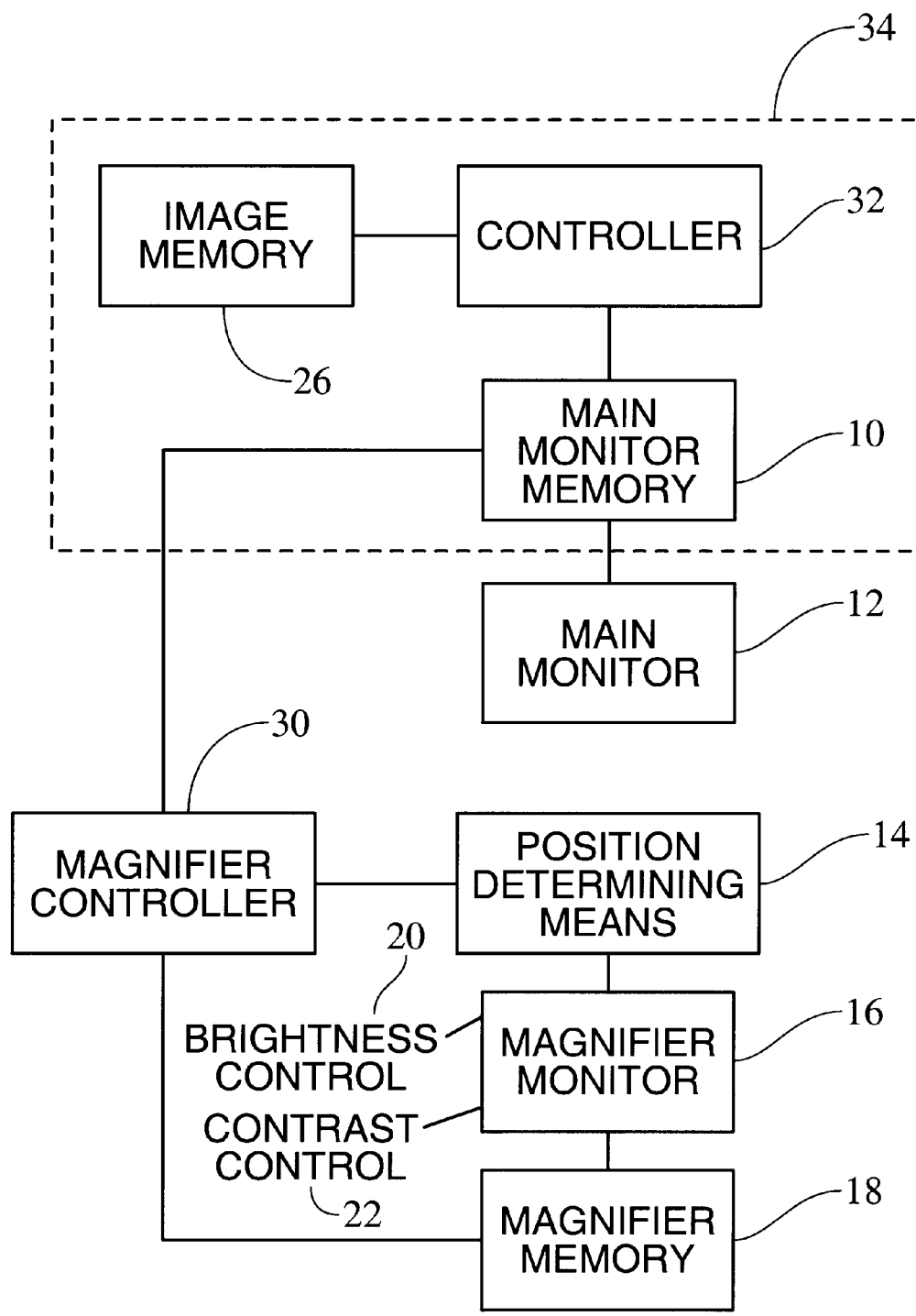
FIG. 2 shows an embodiment of the invention where the magnifier monitor data is obtained from data sent to the main display.

In an alternative embodiment shown in FIG. 2, which finds particular application where the magnifier monitor is adapted for use with the architecture of an existing display system, a controller 32 provides the main monitor memory 10 with data obtained from the image memory 26. Based on the predetermined functionality of the imaging device or on parameters provided by the operator, the controller 32 selects from within the image memory 26 digital data representing the image to displayed on the main monitor 12. The controller 32 takes this data, formats it to satisfy the requirements of the main monitor 12, and stores the reformatted data in the main monitor memory 10 for display on the main monitor 12. The controller 32, image memory 26, and main monitor memory 10 are preferably incorporated into an imaging computer 34.

Again with reference to FIG. 2, the magnifier controller 30 is disposed to capture the data stream being provided to the main monitor 12. Those skilled in the art will recognize that the data stream may come from one of several places, depending on the architecture of the main monitor system, such as a data transmission link between the imaging computer 34 and main monitor 12, a link from the imaging computer 34 a buffer from which the monitor data will be selected, a network, or the data on the way to the main monitor 12 itself.

Based on the calculated position of the magnifier monitor 16 as well as the desired degree of magnification, the magnifier controller 30 selects from within the main monitor memory 10 digital data representing the image to be displayed on the magnifier monitor 16. The magnifier controller 30 takes this data, formats it to satisfy the requirements of the magnifier monitor 16, and stores the reformatted data in the magnifier memory 18 for display on the magnifier monitor 16.

It will be appreciated that, with reference to FIG. 2, the main monitor 12, position determining means 14, magnifier monitor 15, magnifier memory, 18, brightness control 20, and contrast control 22 operate as described above.

Figure 5:
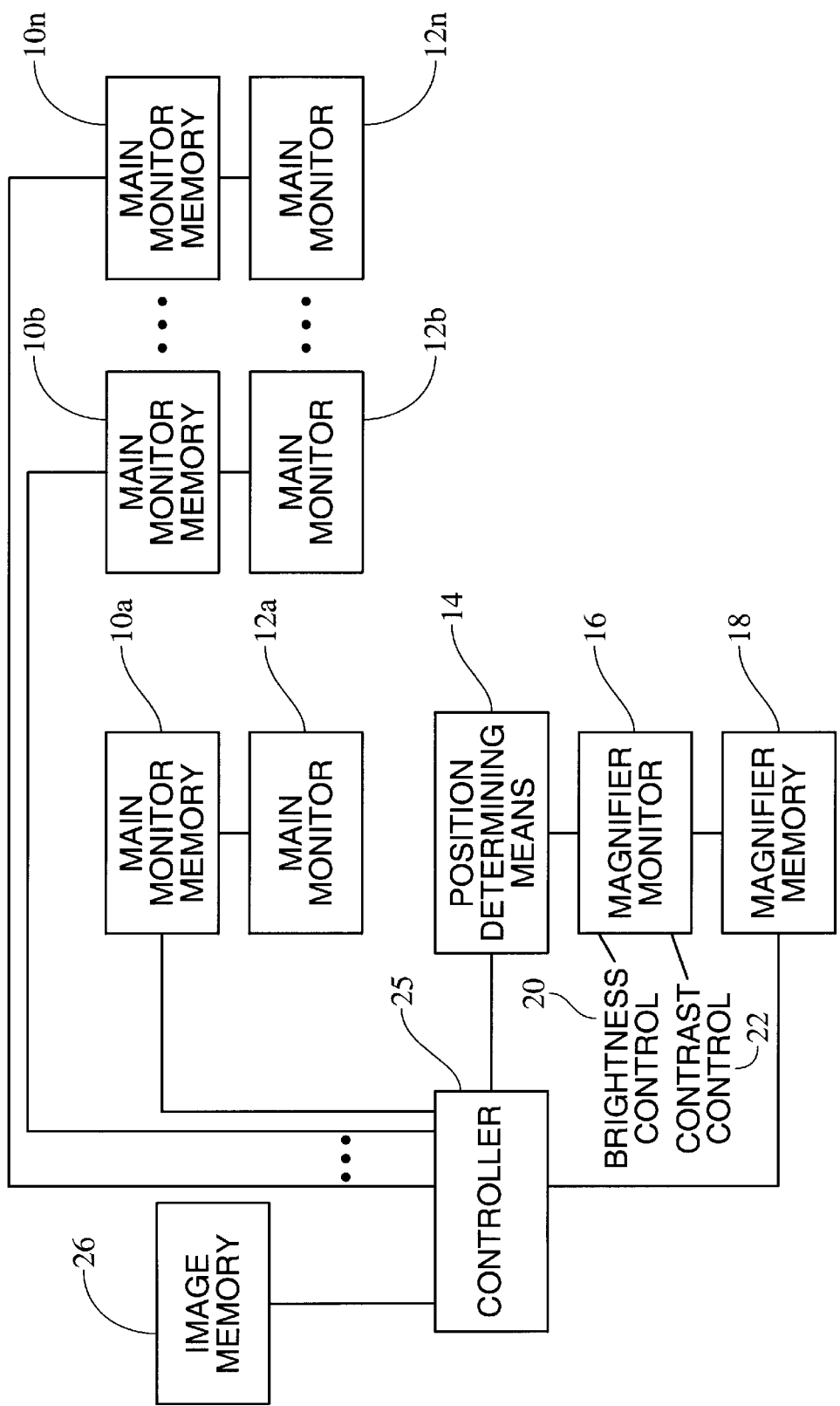
FIG. 5 shows an embodiment of the invention where a single magnifier monitor is adapted for use with a plurality of main monitors where the magnifier monitor data is obtained form the image memory.

It will also be appreciated that the invention is equally applicable where a plurality of main monitors is used, such as in a radiographic viewing room in medical imaging applications. In such applications and with reference to FIG. 5, the magnifier monitor 16 is used in conjunction with a plurality of main monitors 12a–12n, each of which main monitors 12a–12n has a corresponding main monitor memory 10a–10n. Each of the main monitor memories 10a–10n can be a separate memory or an area in a larger memory. The magnifier monitor 16 and the position determining means 14 are adapted for movement over a larger range than that utilized in single main monitor applications. The operator can thus move the magnifier monitor 16 for viewing in conjunction with any one of the plurality of main monitors 12a–12n. In the preferred embodiment, the magnifier monitor 16 is suspended from the ceiling using an articulated mounting arm. The mounting arm is fitted with a plurality of position determining means 14 capable of determining position over a larger range of motion than required in a single monitor application. Again with reference to FIG. 5, the magnifier controller 25 determines, based on the position of the magnifier monitor 16, which of the plurality of main monitors 12a–12n is to be magnified on the magnifier monitor 16. It will be appreciated by one skilled in the art that portions of images from more than one the main monitor 12a–12n may be displayed on magnifier monitor 16. This is particularly advantageous when main monitors 12a–12n are arranged in close physical proximity. In an alternative embodiment, the main monitor to be magnified is selected by the operator using a conventional switch.

Figure 6:
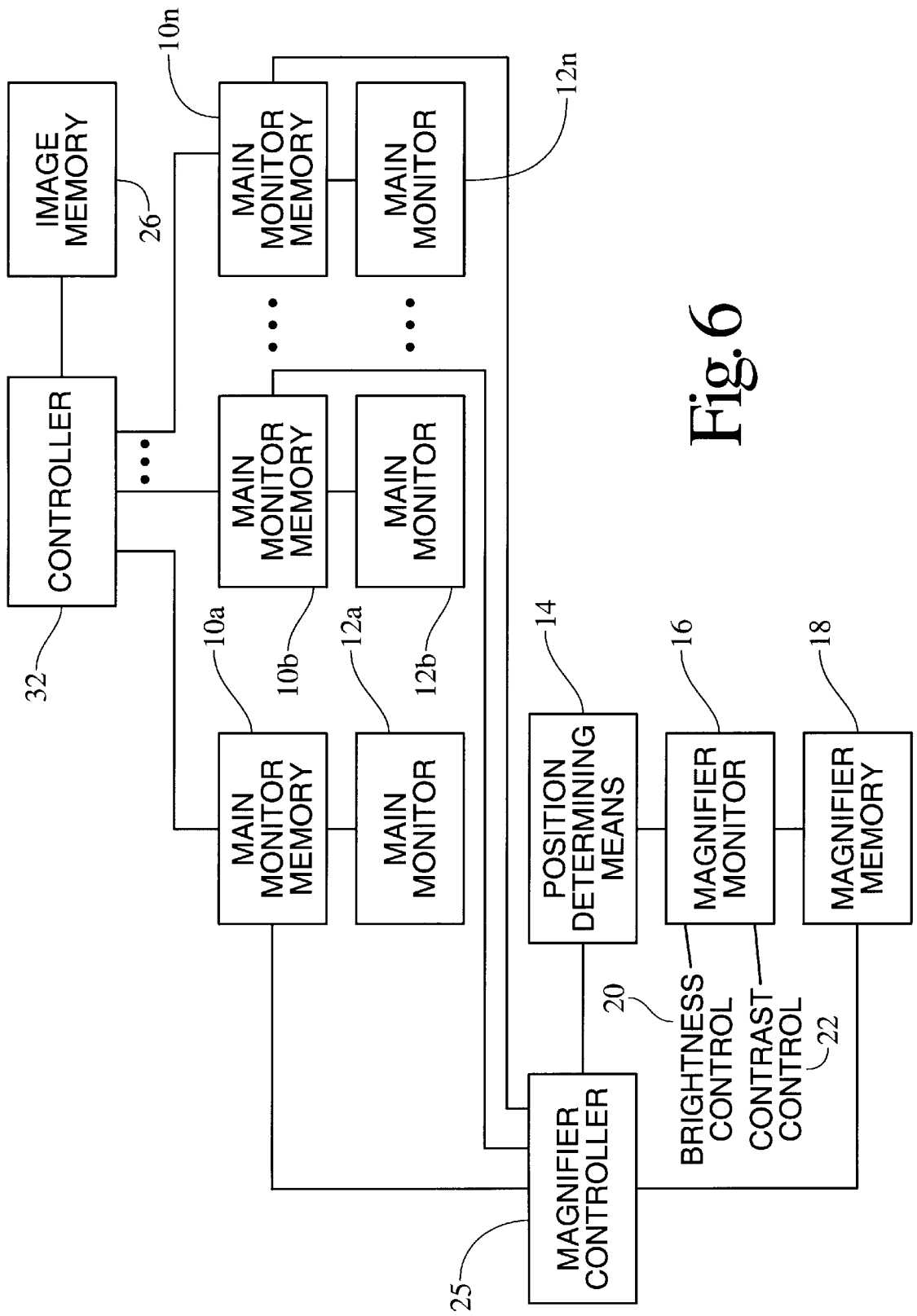
FIG. 6 shows an embodiment of the invention where a single magnifier monitor is adapted for use with a plurality of main monitors, where the magnifier monitor data is obtained from the data sent to the main displays.

Based on which of the main monitors 12a–12n is to be magnified, the calculated position of the magnifier monitor 16, and the desired degree of magnification, the magnifier controller 25 selects from within the image memory 26 digital data representing the image to be displayed on the magnifier monitor 16 as described above. It will be appreciated that each of the main monitors 12 is mounted in a substantially fixed position. With reference to FIG. 6, it will also be appreciated that the above-described multiple main monitor system is equally applicable to configurations in which the magnifier controller 25 obtains data from one of a plurality of main monitor memories 10a–10n.

It is further appreciated that any number of additional image processing functions can be provided in the various the embodiments of the invention. Such controls could include video polarity reversal, an image hold which freezes the magnified image despite further movement of the magnifier monitor, edge enhancement, storage and recall of multiple magnified images, a memory for personalized viewing presets, automatic adjustment of contrast, brightness, and other magnifier monitor parameters depending on image content, and false coloring of the magnified image to permit simultaneous viewing of an original and a processed image. It will also be appreciated that the video data required by the magnifier monitor can be obtained from a variety of different sources depending on the configuration of the existing system. The data can be obtained, for example, by reading data transmitted over a digital data link to one or more main monitors.

The invention has been described in detail above. Obviously, methods and alterations will occur to others upon reading and understanding the preceding detailed description. It is intended that the invention be construed as including all such alterations and modification insofar as they come within the scope of the appended claims or their equivalents.

What is claimed is:

1. A device for selectively displaying a magnified image, the device comprising:

an image memory containing digital data representing at least a first image;

at least one main monitor, each monitor displaying a corresponding main image;

a main monitor memory associated with each main monitor, the main monitor memory containing digital data representing an image to be displayed on the corresponding main monitor;

a magnifier monitor which is movable with respect to each of the main monitors;

a magnifier memory containing digital data representing an image to be displayed on the magnifier monitor;

means for determining the position of the magnifier monitor;

a controller connected to the image memory, the magnifier memory and the position determining means, the controller causing, based on the position of the magnifier monitor, the magnifier memory to contain digital data representing a magnified portion of the image displayed on at least one of the main monitors, said data being obtained from the image memory, whereby a magnified image is displayed on the magnifier monitor.

2. A device according to claim 1, wherein the magnifier monitor is movable in two dimensions, the position of the magnifier monitor within the two dimensions representing the approximate center of a region to be magnified.

3. A device according to claim 2, wherein the magnifier monitor is movable in a third dimension, the position of the magnifier monitor within the third dimension representing the desired magnification of at least one of the main images.

4. A device according to claim 2, further comprising a magnification control for adjusting the desired magnification of at least one of the main images.

5. A device according to claim 1, wherein the position determining means is an ultrasonic locator.

6. A device according to claim 1, wherein the magnifier monitor is movably mounted using a mounting arm and the position determining means is plurality of position encoders.

7. A device for selectively displaying a magnified portion of an image displayed on at least one main monitor, a digital representation of the displayed image being stored in a corresponding main monitor memory, the device comprising:

a magnifier monitor which is movable with respect to each of the main monitors;

means for determining the position of the magnifier monitor;

a magnifier memory containing digital data representing an image to be displayed on the magnifier monitor; and a magnifier controller connected to each of the main monitor memories, the magnifier memory, and the position determining means, the magnifier controller causing, based on the position of the magnifier monitor, the magnifier memory to contain digital data representing a magnified portion of the image displayed on at least one of the main monitors, said data being obtained from the corresponding main monitor memory, whereby a magnified image is displayed on the magnifier monitor.

8. A device according to claim 7, wherein the magnifier monitor is movable in two dimensions, the position of the magnifier monitor within the two dimensions representing the approximate center of a region to be magnified.

9. A device according to claim 8, wherein the magnifier monitor is movable in a third dimension, the position of the magnifier monitor within the third dimension representing the desired magnification of at least one of the main images.

10. The device according to claim 8, further comprising a magnification control for adjusting the desired magnification of at least one of the main images.

11. A device for selectively displaying a magnified portion of an image displayed on at least one main monitor, the device comprising:

a magnifier monitor movably mounted with respect to each of the main monitors;

means for determining the position of the magnifier monitor;

means for causing, based on the position of the magnifier monitor, the magnifier monitor to display a magnified portion of the image displayed on at least one of the main monitors.

12. A method of selectively displaying a magnified portion of a main image, the method comprising the steps of:

determining the position of a magnifier monitor movably mounted with respect to the main image;

causing, based on the position of the magnifier monitor, the magnifier monitor to display a magnified portion of the main image.

13. The method of claim 12, wherein the step of causing comprises:

obtaining, based on the position of the magnifier monitor, data representative of the magnified portion of the main image;

formatting the data to satisfy the requirements of the magnifier monitor; and storing the formatted data in a magnifier memory whereby the image contained in the magnifier memory is displayed on the magnifier monitor.

14. A method according to claim 13 wherein the magnifier monitor is movable in two dimensions, the position of the magnifier monitor within the two dimensions representing the approximate center of a region to be magnified.

15. A method according to claim 14, wherein the magnifier monitor is movable in a third dimension, the third dimension representing the desired magnification of the main image.

16. A method according to claim 13, wherein the position of the magnifier monitor is determined using an ultrasonic locator.

17. A method according to claim 14, wherein the magnifier monitor is mounted on a mounting arm and the position of the magnifier monitor is determined using a plurality of position encoders.

18. A method according to claim 14, further comprising the step of adjusting the desired magnification of the image displayed on magnifier monitor.

* * * * *